(12) United States Patent
Klyne

(10) Patent No.: US 10,603,678 B2
(45) Date of Patent: Mar. 31, 2020

(54) CENTRIFUGE COLLECTION OF MINERALS IN FLOWING WATER

(71) Applicant: Kenneth M Klyne, Bissett (CA)

(72) Inventor: Kenneth M Klyne, Bissett (CA)

( * ) Notice: Subject to any disclaimer, the term of this patent is extended or adjusted under 35 U.S.C. 154(b) by 468 days.

(21) Appl. No.: 15/618,784

(22) Filed: Jun. 9, 2017

(65) Prior Publication Data

US 2017/0361337 A1  Dec. 21, 2017

Related U.S. Application Data

(60) Provisional application No. 62/350,469, filed on Jun. 15, 2016, provisional application No. 62/368,351, filed on Jul. 29, 2016.

(51) Int. Cl.

| | | |
|---|---|---|
| *B04B 11/02* | (2006.01) | |
| *C22B 11/02* | (2006.01) | |
| *B03B 5/32* | (2006.01) | |
| *B01D 21/26* | (2006.01) | |
| *B04B 9/06* | (2006.01) | |
| *C22B 11/00* | (2006.01) | |

(52) U.S. Cl.
CPC ............ *B04B 11/02* (2013.01); *B01D 21/262* (2013.01); *B03B 5/32* (2013.01); *B04B 9/06* (2013.01); *C22B 11/00* (2013.01); *C22B 11/02* (2013.01); *B01D 2221/08* (2013.01)

(58) Field of Classification Search
CPC ....... B04B 5/0421; B04B 5/0414; B04B 7/08; B04B 5/02; B04B 1/00; B04B 1/02; B04B 9/06; B04B 11/02; B04B 11/06; B04B 11/08; B01L 3/5021; B01L 2300/0858; B01L 9/06; B01L 2200/02; C22B 11/00; C22B 11/04; C22B 11/042; F03B 1/00; F03B 1/02; F03B 3/12; F03B 7/00; F03B 7/003; F03B 17/06; F03B 17/061; F03B 17/062; F03B 17/063
USPC .................. 209/422–505; 494/49, 56, 58, 59
See application file for complete search history.

(56) References Cited

U.S. PATENT DOCUMENTS

| | | | | |
|---|---|---|---|---|
| 1,835,018 A | * | 12/1931 | Darrieus | .................... F01D 1/14 |
| | | | | 415/224 |
| 1,966,892 A | * | 7/1934 | Hamren | .................... F03B 1/00 |
| | | | | 418/183 |
| 5,354,256 A | * | 10/1994 | Knelson | .................... B04B 1/00 |
| | | | | 209/453 |

* cited by examiner

*Primary Examiner* — Walter D. Griffin
*Assistant Examiner* — Shuyi S. Liu
(74) *Attorney, Agent, or Firm* — Adrian D. Battison; Ade & Company Inc.; Michael R. Williams

(57) ABSTRACT

An apparatus for collection of heavier particles such as gold flowing in a river includes a support frame with legs for mounting in the river spaced from the bed with a series of drum mounted on the support frame one behind the other for rotation about an axis transverse to the river flow. The drums have a plurality of blades mounted so that flow of water in the river causes a rotation of the drum, a plurality of water entry openings and a plurality of discharge openings in the drum with the drum shaped such that rotation causes a centrifugal action such that the heavier particles remain within the drum against escape from the drum while lighter particles and water are discharged.

18 Claims, 4 Drawing Sheets

CENTRIFUGE COLLECTION OF MINERALS IN FLOWING WATER

This application claims the benefit under 35 USC 119 (e) of provisional applications 62/350,469 filed Jun. 15, 2016 and 62/368,351 filed Jul. 29, 2016, the disclosures of both of which are incorporated herein by reference.

This invention relates to an apparatus for collection of minerals flowing in a river using a centrifuge driven by the flowing water.

The minerals to be collected include any heavier materials which are separated by the centrifugal action from lighter particles which are expelled. These collected heavier materials can include gold and other heavy metals. Also the collected materials can include Kimberlites which, as is well known act as indicated minerals for other materials. Thus the presence of Kimberlites in the flowing water can be detected by collecting those Kimberlites using the arrangement of the present invention to provide valuable geological information.

The apparatus therefore is designed to use the flow of the water in the river to cause rotation of a centrifuge drum or other member to separate the heavier materials within the drum. Thus the water flow is arranged into the drum and to escape from the drum while the heavier materials collect on the inside of the drum and water and light materials escape. The devices thus powered by the water flow and can be left unattended for an extended period.

While much of the gold within a river is precipitated into the sediment, some of the gold is of sufficiently small size that it remains mixed in the turbulence of the water and this can be extracted by a centrifuge within the water. This avoids the necessity to extract bottom sediment which process is becoming ecologically unacceptable.

SUMMARY OF THE INVENTION

It is an object of the present invention to provide an apparatus for collection of heavy particles, such as gold, flowing in a river using a centrifuge driven by the flowing water According to the invention there is provided an apparatus for collection of heavy particles flowing in a river comprising:

a support frame for mounting in the river;

a drum mounted on the support frame for rotation about a longitudinal axis of the drum such that, when located in the river on the frame, the axis is located transverse to the river flow;

a plurality of projecting elements or blades mounted on or connected to the drum so that flow of water in the river engages the elements and causes a rotation of the drum about the axis;

a plurality of entry openings in the drum allowing entry of the river water carrying particles into the drum;

a plurality of discharge openings in the drum allowing discharge of the river water from inside the drum back into the river;

the drum being shaped and arranged such that rotation of the drum causes a centrifugal action on the water and particles within the drum for collection of heavier particles against an outer wall of the drum;

the entry openings and the discharge openings being arranged such that the heavier particles remain within the drum against escape from the drum while lighter particles and water are discharged.

Preferably the projecting elements, which can be in the form of any surface arrangement which acts as a driving blade when impacted by the flowing water, are mounted on the drum at angularly spaced positions around the drum with the driving surface of the element extending outwardly from a peripheral surface of the drum to an edge of the surface spaced outwardly of the drum. The surfaces preferably lie in or approximate to radial planes of the drum. However other arrangements of the elements are possible including arrangements where the elements or blades form a propelling device separate from the drum but including a drive system which transfers rotation of the blades on a hub to the drum.

In some cases each blade includes a first wall extending in generally radially outwardly of the drum and a support wall extending rearwardly from an upper edge of the first wall. This arrangement can be readily attached onto the peripheral surface of an existing drum. The drum can thus be formed for example as a plastic tube with angle members attached onto the outside surface to form the blades.

Where the drum includes a cylindrical peripheral wall, preferably the inlet openings in the peripheral wall each include a mouth extending from the peripheral wall as a duct or tube to an inner edge spaced inwardly from the peripheral wall to prevent escape of the heavier particles collecting on the peripheral wall. In one arrangement the mouth is defined at an inner end of a tube extending inwardly from the peripheral wall.

Preferably at least some of the openings are provided in an end wall of the drum which openings are spaced inwardly from an outer diameter of the drum to prevent escape of the heavier particles collecting at the outer diameter through the openings in the end wall.

In an alternative arrangement, the drum includes a peripheral wall including a first portion of larger diameter and a second portion of smaller diameter wherein at least some of the inlet openings are provided in the portion of smaller diameter allowing the heavier particles to collect at the portion of larger diameter. In this arrangement preferably the blades are located on the peripheral wall at the portion of smaller diameter so that the outer edge of the blades is at or adjacent the outer cylindrical shape of the drum at the larger diameter.

In this arrangement, preferably the peripheral wall is of smaller diameter at a central region and larger at both ends so that it forms a waisted or diablo shape with collection zones at the ends of the drum. Inlet openings in the peripheral wall are then positioned spaced from the end zones where the material collects so that the shape of the drum itself prevents the material from escaping through these holes since they are radially spaced inwardly from the ends.

In order that the blades provide the rotation of the drum in a single direction, preferably there is provided a water flow guide surface for directing water flow in front of the drum onto the drum at a position thereon to drive the blades to rotate the drum. This can comprise a simple guide surface located relative to the drum so that water departing from a rear edge of the surface or blade is directed onto the blades or fins of the drum. The guide surface can extend substantially along the full length of the drum or can be of reduced width. In one preferred arrangement, the guide surface acts to guide the water to the required location angularly of the drum to cause the rotation and also directs the water toward a required location axially of the drum to confine the water to move toward the entry opening in the surface. In this way the entry opening can form a slot of a relatively short length relative to the length of the drum with water across a full width of the drum converged toward the inlet slot.

Each drum can be mounted a single unit on its own frame or, In order to provide a significant centrifuge action at a single location within the river, there can be provided a plurality of drums arranged in a row one behind the other on the frame. In this way the frame can be located privately within the river at a location known to the user so that the frame can be recovered periodically, the drum cleaned to remove the collected materials and returned to the river at the riverbed without disturbing the riverbed.

Preferably the frame includes two side rails spaced at the length of the plurality of drums so that the ends of the single drum or plurality of drums are carried on the two side rails and includes support legs extending downwardly to a bottom of the river bed to support the drum at a position spaced from the riverbed.

Where the arrangement is used to collect Kimberlites, in some cases the collection of material is assisted by lifting some material from the bed and discharging this material into the river flow just ahead of the centrifuge device so that the lifted material is collected rapidly allowing immediate investigation of the content of the device for those minerals.

The term drum as used herein is not used to denote any particular shape of the drum so that the drum does not have to be cylindrical and does not have to have closed ends.

The drum may be mounted on a shaft which extends through the length of the drum or it may be simply mounted on bearings at the ends of the drum without having any supporting central shaft.

BRIEF DESCRIPTION OF THE DRAWINGS

One embodiment of the invention will now be described in conjunction with the accompanying drawings in which.

Figure 1:
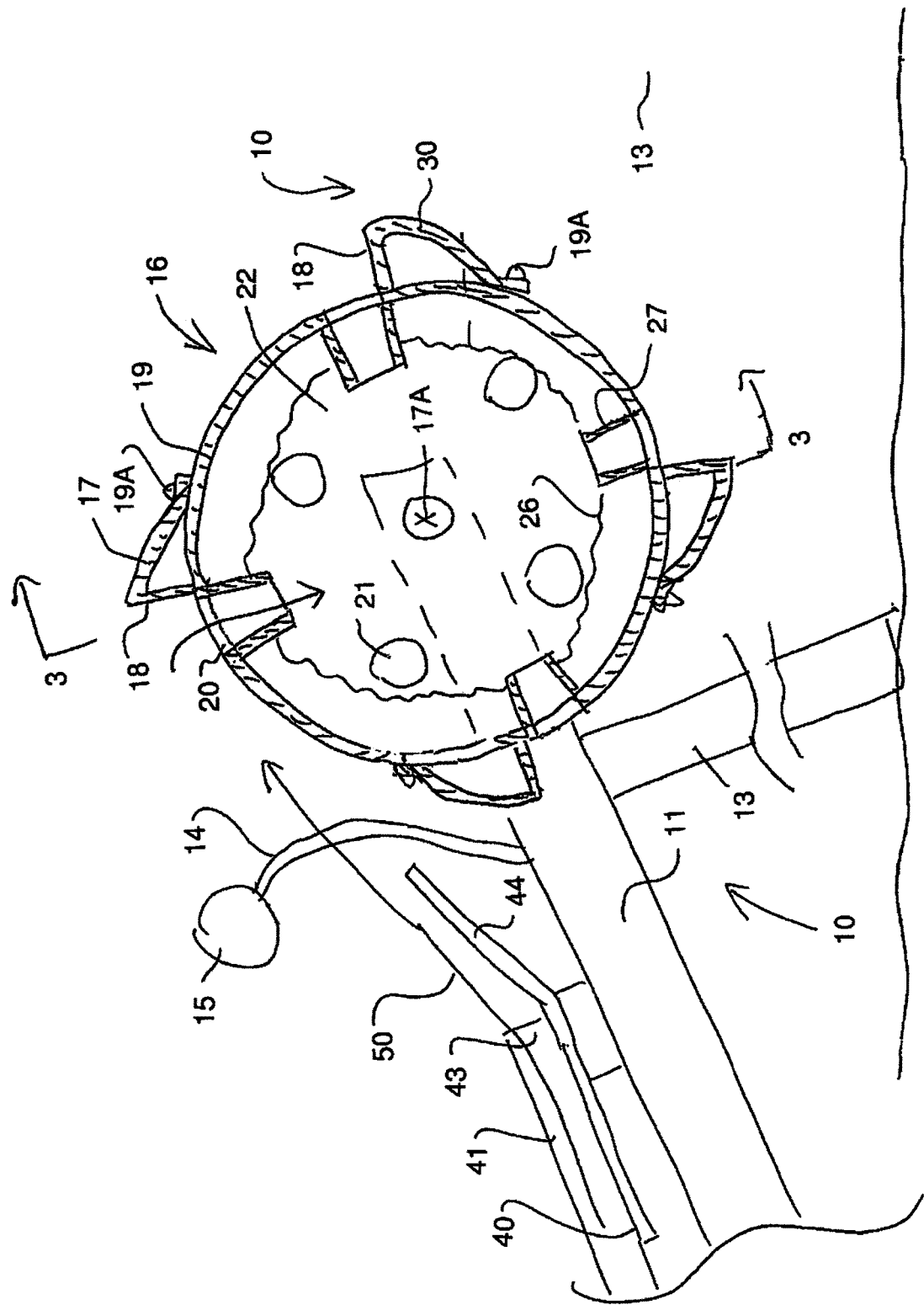
FIG. 1 is a longitudinal cross-sectional view of an apparatus according to the present invention.
Figure 2:
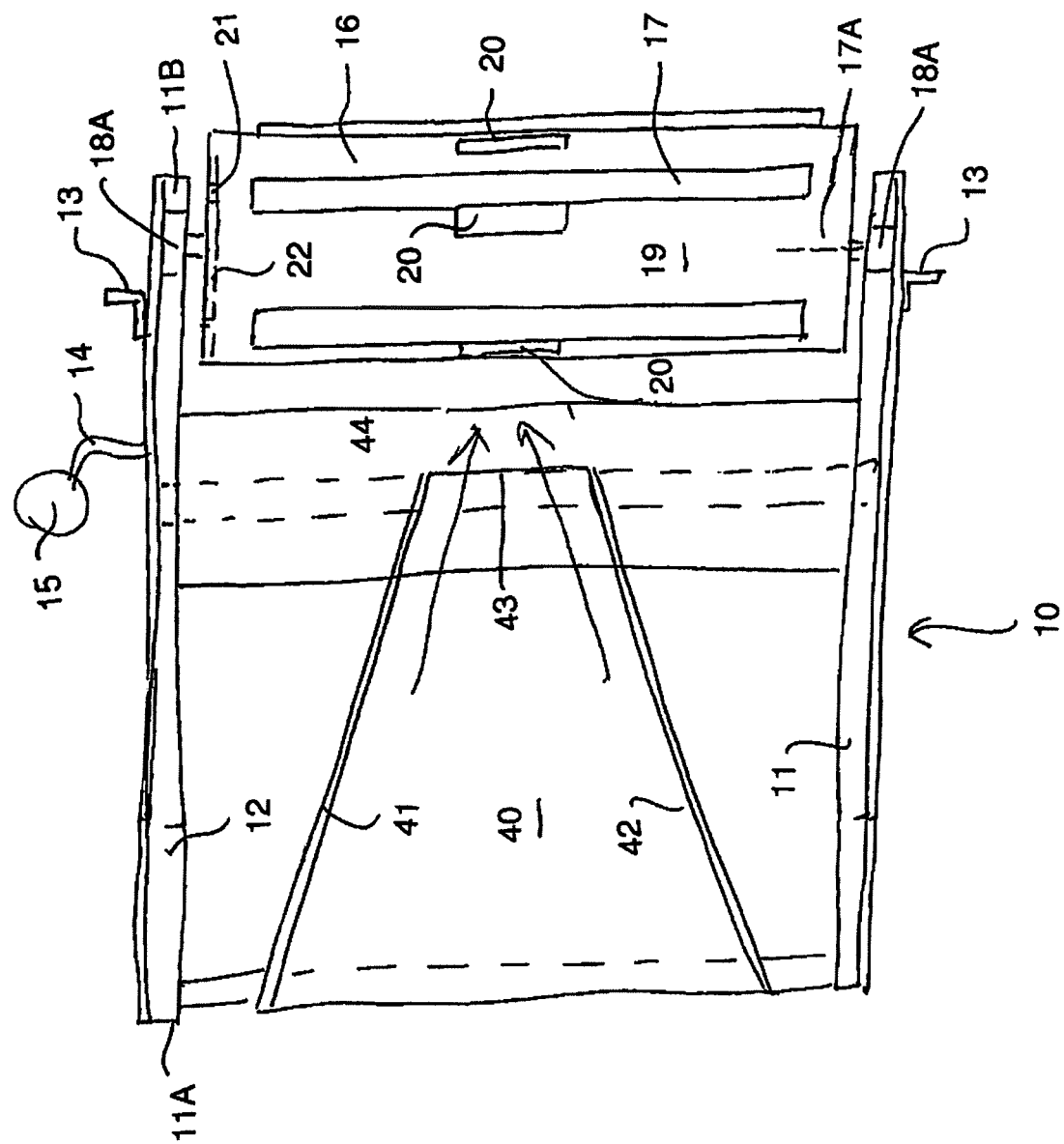
FIG. 2 is a top plan view of the apparatus of FIG. 1.
Figure 3:
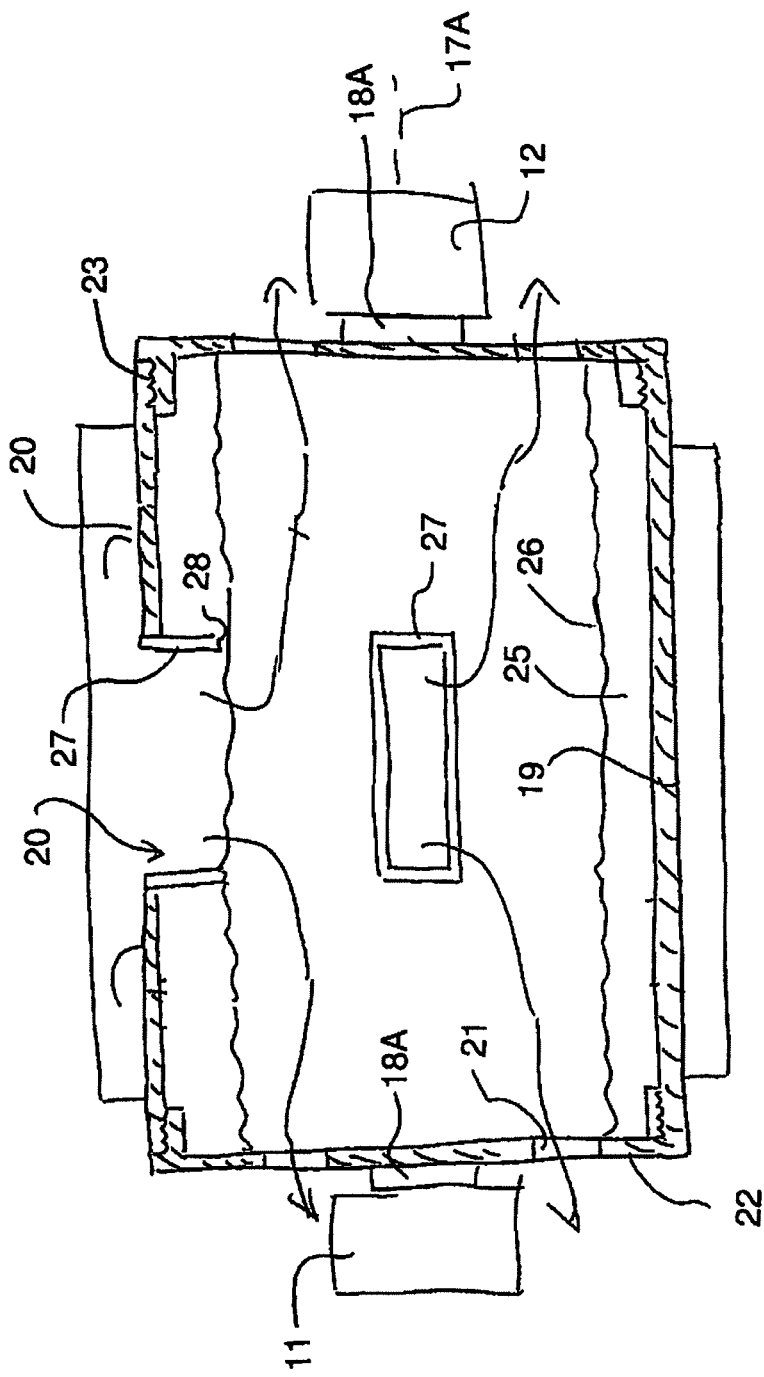
FIG. 3 is a cross-sectional view along the lines 3-3 of FIG. 1.

DETAILED DESCRIPTION in FIGS. 1 to 3 is shown an apparatus according to the invention for collection of gold or other heavy particles flowing in a river which comprises a support frame 10 defined by two side rails 11 and 12 together with supporting components or legs 13 which support the side rails from a riverbed so that the side rails are carried in a position away from the material in the riverbed on so that the legs or support elements do not damage or interfere with the riverbed.

As shown in FIG. 1, the side rails can be inclined downwardly and forwardly from an upper rear end 11B carrying the drum to a forward lower end 11A at the river bed. The legs 13 are attached behind the bearings of the drum and extend downwardly form the side rails at right angles thereto to the bed.

Thus the frame sits in the river accessible to the flow of water in the river and can be readily removed from the river when required to access the separation system. For example a tether 14 can be provided which locates the device and a required position and which may include a marker 15 indicating the position to the authorized user of the system.

The support frame carries one or more drums 16 mounted on the side rails 11 and 12 for rotation about an axis 17A defined by bearings 18A at the ends of the drum. In this way when located in the river on the frame, the axis is located transverse to the river flow.

Each drum 16 has a plurality of blades 17 mounted on the drum so that flow of water in the river engages the blades and causes a rotation of the drum about the axis. The blades 17 form a radial blade surface 18 standing outwardly from a peripheral wall 19 of the drum at angularly spaced positions around the drum. The number of blades can vary from the exemplary number of four blades shown in the example illustrated.

Just in front of each blade is provided at least one entry opening 20 in the peripheral wall of the drum allowing entry of the river water carrying particles into the drum. With the openings positioned just in front of the radial blades, there is a pressure on the water at this location to enter into the opening 20 and pass into the hollow interior of the drum.

Also a plurality of discharge openings is provided in the drum including openings 21 in the end wall 22 of the drum allowing discharge of the river water from inside the drum back into the river.

In this embodiment the drum is formed so that peripheral wall 19 is a simple tube with the end walls 22 including a threaded coupling 23 by which an outside edge of the end walls is that coupled to the ends of the drum to form a closed drum structure. Other structural arrangements can be used to form the simple structural tubular member forming the drum.

In operation, therefore, the blades 17 are arranged to cause rotation of the drum about the axis 17A of the bearings 18A while water is driven into the hollow interior of the drum through at least one of the openings 20 in the peripheral wall 19. The water can escape through others of the openings either in the peripheral wall or in the arrangement as shown through the end openings 21.

The drum is shaped and arranged such that rotation of the drum causes a centrifugal action on the water and particles within the drum for collection of heavier particles against an outer wall of the drum. In this embodiment using a simple tubular drum, the outer wall is formed by the peripheral wall 19. However other more complex structures can be used where the outer wall is a portion of the structure which forms a surface surrounding the axis over which the fluid material passes as it moves from the inlets to the outlets to carry out the centrifuge action.

This centrifugal action tends to collect particles 25 on the inside surface of the peripheral wall 19 up to an inside surface 26 of the particles. This inside surface is defined by the outermost edge of the holes 21 and the innermost ends of tubes 27 located on the inlet openings 20. Thus each opening 20 has an inwardly extending tube 27 on its inside surface with the tube defining a mouth 28 spaced inwardly from the peripheral wall 19. In this way, any water escaping outwardly through the mouth 28 or through the openings 20 is prevented from carrying with it the particles collected in the particle layer 25. The surface 26 thus forms an exchange surface in which heavier particles in the water flow replace lighter particles collected in the bed or layer 25 in a typical centrifugal action. Thus the entry openings and the discharge openings are arranged such that the heavier particles remain within the drum against escape from the drum while lighter particles and water are discharged.

In this embodiment, each blade includes a first wall 18 extending in generally radially outwardly of the drum and a support wall 30 extending rearwardly from an upper edge of the first wall 18 to act as a brace with the support wall being attached to the peripheral wall 19 by fasteners 19A. This enables the blades 17 to be simply formed as angle members which are attached to the outside surface of a conventional tube.

Each blade 17 can have in front of it on the peripheral wall 19 a plurality of inlet openings at spaced positions along the drum. However in the embodiment shown there is a single slot shaped opening at the center of the drum and relatively short in comparison with the length of the drum. In order to assist in causing the particles to enter this entry slot 20, the frame 10 carries a guide chute 40 with converging upturned side edges 41 and 42 converging to a mouth 43 approximately of the same width as the inlet slot 20. At the mouth 43, there is provided an upturned guide surface 44 inclined upwardly in a direction 50 generally tangential to the drum to carry the water and particles toward the blade 18 which is temporarily at the top of the drum. Thus the guided material impinges on the surface 18 and acts to spin the drum while the increase in pressure at the front face of the blade 18 acts to drive the material into the inlet opening 20 and the tube 27 at that inlet.

Figure 4:
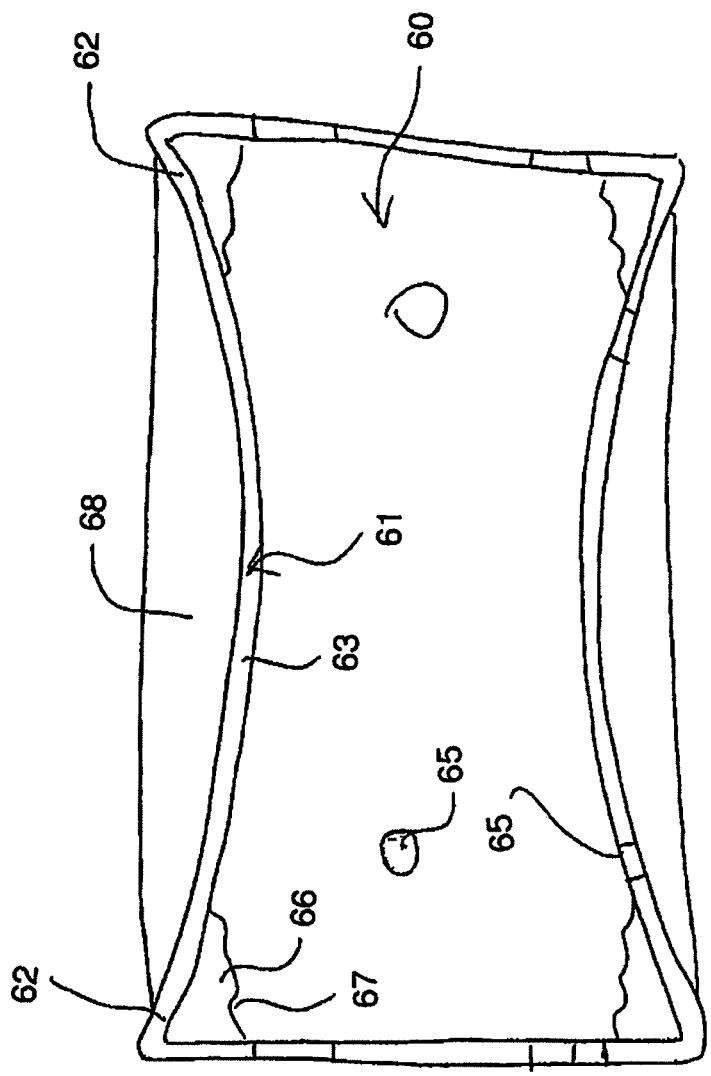
FIG. 4 is a cross-sectional view similar to that of FIG. 3 showing an alternative arrangement.

As shown in FIG. 4 there is an alternative arrangement in which the drum 60 includes a peripheral wall 61 including a first portion 62 of larger diameter and a second portion 63 of smaller diameter. In this arrangement at least some of the inlet openings 65 are provided in the portion 63 of smaller diameter allowing the heavier particles 66 in the bed 67 to collect at the portion 62 of larger diameter.

In this arrangement the blades 68 are located on the peripheral wall at the portion 63 of smaller diameter and form simple radially extending fins lying in a radial plane of the axis of the drum. As best shown in FIG. 4, the peripheral wall 61 is of smaller diameter at a central region 63 and larger at both ends 62. This arrangement avoids the necessity for tubes mounted on the inlet openings 65 since those inlet openings are spaced radially inwardly from the surface of the bed 67 in view of their location on the peripheral wall 61.

As shown in FIGS. 1 and 2 there is provided a water flow guide surface or blade 40, 44 for the drum carried on the frame 10 for directing water flow in front of the drum onto the drum at a position thereon to drive the blades to rotate the drum. That is the surface defined by the components 40 and 44 is shaped to direct water away from the radial plane of the axis 17A upwardly to impinge on the front face 18 of the blades to cause rotation of the drums in the clockwise direction. This acts to spin all of the drums to provide the centrifugal action. The surface 44 has the same with as the drum substantially across the full space between the side rails 11 and 12 so as to direct the water along the full length of the drum to provide effective rotation. The frame can be arranged to carry a series of drums in a row to increase capacity or a single drum may be provided on its own frame.

After the system has been in operation for a sufficient period of time to collect heavy particles in a quantity at which the separation efficiency commences to decrease, the apparatus is removed and the heavy particles collected or extracted allowing the apparatus to be returned for another batch.

In the first embodiment, the particles can be extracted by removing one or both ends and washing out the interior of the cylinder.

In the second embodiment, plugs are provided at the area of larger diameter and removed to allow the particles to flow out, possible assisted by washing water where required.

Since various modifications can be made in my invention as herein above described, and many apparently widely different embodiments of same made within the spirit and scope of the claims without departmert from such spirit and scope, it is intended that all matter contained in the accompanying specification shall be interpreted as illustrative only and not in a limiting sense.

The invention claimed is:

1. Apparatus for collection of heavier particles flowing in a river comprising:
    a support frame for mounting in the river;
    a drum mounted on the support frame for rotation about a longitudinal axis of the drum such that when located in the river on the frame, the axis is located transverse to the river flow;
    a plurality of blades mounted on or connected to the drum so that flow of water in the river engages the blades and causes a rotation of the drum about the axis;
    a plurality of entry openings in the drum allowing entry of the river water carrying particles into the drum;
    a plurality of discharge openings in the drum allowing discharge of the river water from inside the drum back into the river;
    the drum having a peripheral wall and being shaped and arranged such that rotation of the drum causes a centrifugal action on the water and particles within the drum for collection of heavier particles against the peripheral wall of the drum;
    the entry openings and the discharge openings being arranged such that the heavier particles remain within the drum against escape from the drum while lighter particles and water are discharged.

2. The apparatus according to claim 1 wherein the blades are mounted on the drum at angularly spaced positions around the drum and extend outwardly from the peripheral wall of the drum.

3. The apparatus according to claim 1 wherein the blades lie in radial planes of the drum.

4. The apparatus according to claim 1 wherein each blade includes a first wall extending generally radially outwardly from the peripheral wall of the drum and a support wall inclined from an upper edge of the first wall inwardly toward the peripheral wall.

5. The apparatus according to claim 1 wherein the entry openings are provided in the peripheral wall and each includes a mouth spaced inwardly from the peripheral wall to prevent escape back through the entry openings of the heavier particles collecting on the peripheral wall.

6. The apparatus according to claim 5 wherein the mouth is defined at an inner end of a tube extending inwardly from the peripheral wall.

7. The apparatus according to claim 1 wherein at least some of the discharge openings are provided in an end wall of the drum which discharge openings are spaced inwardly from the peripheral wall of the drum to prevent escape of the heavier particles collecting at the peripheral wall through the discharge openings in the end wall.

8. The apparatus according to claim 1 wherein the peripheral wall includes a first portion of larger diameter and a second portion of smaller diameter wherein at least some of the entry openings are provided in the second portion of smaller diameter allowing the heavier particles to collect at the first portion of larger diameter.

9. The apparatus according to claim 8 wherein the blades are located on the peripheral wall at the portion of smaller diameter.

10. The apparatus according to claim 8 wherein the peripheral wall is of smaller diameter at a central region and of a larger diameter at both ends.

11. The apparatus according to claim 1 wherein there is provided a water flow guide surface mounted at a location in front of the drum where the guide surface engages the water and carries the water onto the drum at a position thereon to drive the blades to rotate the drum.

12. The apparatus according to claim 11 wherein the water flow guide surface is located substantially along the full length of the drum.

13. The apparatus according to claim 1 wherein the frame includes two side rails spaced at the length of drum so that the ends of the drum are carried on the two side rails.

14. The apparatus according to claim 1 wherein the support frame includes support legs extending downwardly to a bottom of the river bed to support the drum at a position spaced from the riverbed.

15. The apparatus according to claim 1 wherein the drum has said entry openings at angularly spaced positions around the drum so that each entry opening in turn is moved to a position to receive the water.

16. The apparatus according to claim 1 wherein there is provided a water flow guide chute mounted on the support frame and having two converging sides of the chute acting to converge water in a direction axially of the drum so that the water is converged to a portion only of the length of the drum to direct the water flow into the entry openings.

17. The apparatus according to claim 16 wherein the entry openings are arranged at each of a plurality of angularly spaced positions around the drum and at positions spaced from each end of the drum.

18. The apparatus according to claim 16 wherein the water flow guide chute comprises a pan mounted on the support frame with upturned converging side edges defining said converging sides.

* * * * *